A. A. STAHL.
ATTACHMENT FOR CORN PLANTERS.
APPLICATION FILED DEC. 23, 1921.
1,429,700. Patented Sept. 19, 1922.
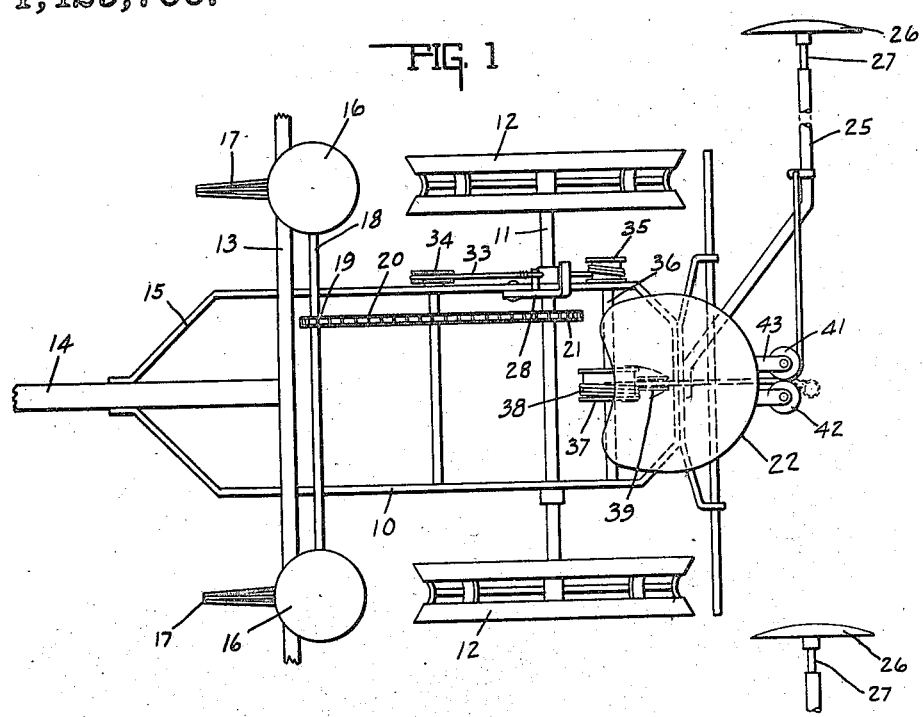
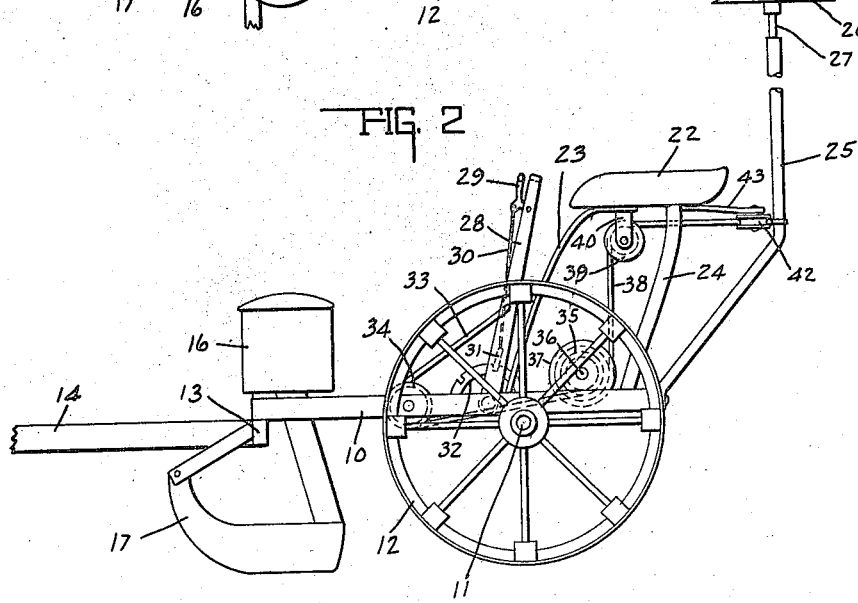
INVENTOR.
ALLEN A. STAHL.
BY
ATTORNEYS.

Patented Sept. 19, 1922.

1,429,700

UNITED STATES PATENT OFFICE.

ALLEN A. STAHL, OF SHERIDAN, INDIANA.

ATTACHMENT FOR CORN PLANTERS.

Application filed December 23, 1921. Serial No. 524,402.

*To all whom it may concern:*

Be it known that I, ALLEN A. STAHL, a citizen of the United States, and a resident of Sheridan, county of Hamilton, and State of Indiana, have invented a certain new and useful Attachment for Corn Planters; and I do hereby declare that the following is a full, clear, and exact description thereof, reference being had to the accompanying drawings, in which like numerals refer to like parts.

This invention relates to corn planters, plant setters and the like, and such farming implements as it may be necessary to guide during their operation, and more particularly to the means for manipulating the marker common to such machines for causing the ground to be marked, whereby the planted rows will be properly spaced.

On machines of this type it is a common practice to provide a laterally extending shaft having a disk marker on the end thereof which rides upon the ground at a set distance from the machine for marking the same and thereby giving the operator a line for guidance upon the return trip across the field. It is, therefore, necessary upon making each turn that the marker be moved from one side of the machine to the other, and also elevated until after the machine is turned. There have been types of machines having automatically operated markers, but the majority of such machines depend upon the operator reaching down a considerable distance below the seat and behind the same, grasping the shaft and elevating the disk so as to hold it from the ground until the machine is turned and then dropping it on the other side. This is difficult to do while turning, because of the handling of the team and the planting mechanism of the machine during the turning movement.

It is the object of this invention to provide a simple arrangement for permitting the marker to be elevated and dropped on the other side of the machine while turning, by means of a conveniently positioned hand lever which may be readily grasped and quickly operated by the driver.

The full nature of the invention will be understood from the accompanying drawings and the following description and claim.

In the drawings, Fig. 1 is a plan view of a corn planter showing the marker operating attachment with the marker in ground engaging position. Fig. 2 is a side elevation of the same showing the marker in elevated position.

In the drawings there is shown a corn planter having the usual frame 10, axle 11 and wheels 12, the frame being attached to a forward cross bar 13 to which is connected the pole 14 and braces 15. Supported upon the cross bar 13, there are corn hoppers 16 provided with the usual cutters or openers 17 which open the earth and permit the seed to drop therein from the hopper. The hopper is provided with valves for controlling the discharge of the seed therefrom, not shown herein, driven by the usual shaft 18, sprocket 19 and driving chain 20 from a sprocket 21 mounted on the shaft 11 which extends through suitable bearings in the frame 10. The driver's or operator's seat 22 is supported in elevated position on the frame 10 by the supporting members 23 and 24. The above described construction is of the common and well known type, and there is shown and described herein only the skeleton parts of the machine necessary for its operation omitting the details of the adjusting and controlling mechanism for the planters.

The marker comprises a shaft 25 pivotally secured at its end upon the rear of the frame 10 and so bent as to clear the wheels 12 and seat 22. It extends laterally from the machine, as indicated in Fig. 1. On the end of the shaft 25, there is a marker disk 26 adapted to ride upon the ground for marking the same, said disk being mounted upon a bar 27 which is slidably adjustable in the shaft 25 for permitting the device to make a mark at the desired distance from the wheels. Pivotally mounted upon one of the side bars of the frame 10 and immediately forward of the seat 22, there is a hand lever 28 provided with the latch 29 and latching rod 30 on the end of which there is the usual pawl 31 engaging in the ratchet 32. Attached to said lever intermediate its ends, there is a cable 33 which passes about a pulley 34 mounted upon said frame forward of said lever, and thence about the drum 35 mounted at the rear of the lever. The drum 35 is keyed upon the shaft 36 which is mounted in suitable bearings between the side bars of the frame 10 so as to cause said shaft to turn with the movement of the lever 28. Keyed centrally of said shaft and immediately below the seat 22, there is a drum 37 of increased diameter about which there is wound the cable 38 which extends upwardly over the pulley 39, which is mounted in a depending bracket 40 secured to the bottom of the seat 22. The cable 38 passes from over the pulley 39 horizontally under said seat between the pulleys 41 and 42 which are mounted upon the bracket 43 extending rearwardly from the bottom of the seat 22 to a position substantially in the plane of the laterally extending shaft 25. Said pulleys are grooved so that the cable 38 cannot escape from between them. Said cable passes about one of said pulleys and is attached at its end to a ring 44 mounted upon said shaft.

By means of this arrangement when a turn is made and the corn planter is driven in the opposite direction, the operator who is seated upon the seat 22 grasps the hand lever 28 and pulls it back smartly causing the cable 33 to turn the shaft 36 upon which is keyed the drum 37, said drum pulling in on the cable 38 so as to elevate the shaft 25 to a substantially perpendicular position as shown in Fig. 2. As the shaft 25 and marker 26 are brought upwardly by the movement of said lever, they continue to move over dead center and lean slightly in the opposite direction. With the marker so elevated, the lever is released and remains in its upright position, as shown in Fig. 2, until the corn planter has been turned and it is desired to lower the marker. The operator then releases the latch 29 pushing the lever forward, which permits the marker to be lowered into ground engaging position. Since the sharp upward movement of the marker has caused it to pass over dead center and incline toward the opposite side of the planter from which it had been riding, when it is released it falls upon the opposite side as desired and is then ready to mark while the planter moves in the opposite direction.

Whereas the marker operating mechanism is herein shown attached to a corn planter, it may be readily adaptable to use upon plant setters or tractors using a guide. The arrangement and operation of such machines would be the same as above described.

Although the invention has been herein described in detail in connection with the use of a hand lever, cables and pulleys, the same principle may be employed with the use of foot levers or chains, sprockets and gears or the like without departing from this invention.

The invention claimed is:

In a machine of the class described, the combination with a supporting frame, an operator's seat mounted upon said frame, a marker comprising a guide shaft pivoted to said frame and having a marking member mounted thereon, means for elevating and throwing said marker from one side of the machine to the other, comprising a shaft rotatably mounted transversely of said frame, a winding drum keyed upon said shaft near the center thereof, a second winding drum keyed to the end of said shaft, a lever pivoted to said frame, a cable connecting said lever with said last mentioned drum so that said drum will be rotated by the operation thereof, a second cable connected to said first mentioned drum and guide shaft, and a plurality of pulleys mounted above said frame over which said last mentioned cable is adapted to pass for drawing said arm to elevated position and permitting it to drop to the other side of said frame, substantially as described.

In witness whereof, I have hereunto affixed my signature.

ALLEN A. STAHL.